(12) United States Patent
Manjeshwar et al.

(10) Patent No.: US 7,381,959 B2
(45) Date of Patent: Jun. 3, 2008

(54) TECHNIQUE FOR RECONSTRUCTING PET SCAN IMAGES

(75) Inventors: Ravindra Mohan Manjeshwar, Guilderland, NY (US); Floribertus Philippus Martinus Heukensfeldt Jansen, Ballston Lake, NY (US); Charles William Stearns, New Berlin, WI (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 11/205,067

(22) Filed: Aug. 17, 2005

(65) Prior Publication Data

US 2007/0040122 A1    Feb. 22, 2007

(51) Int. Cl.
*G01T 1/163*    (2006.01)

(52) U.S. Cl. ................................. 250/363.03
(58) Field of Classification Search ............ 250/363.03
See application file for complete search history.

(56) References Cited

U.S. PATENT DOCUMENTS

| | | | |
|---|---|---|---|
| 5,608,221 A * | 3/1997 | Bertelsen et al. ...... | 250/363.03 |
| 6,294,788 B1 * | 9/2001 | Cooke et al. .......... | 250/363.03 |
| 6,528,793 B1 * | 3/2003 | Chen et al. ............ | 250/363.03 |
| 6,631,284 B2 * | 10/2003 | Nutt et al. ................... | 600/427 |
| 7,127,095 B2 * | 10/2006 | El Fakhri et al. ........... | 382/128 |
| 7,129,496 B2 | 10/2006 | Stearns et al. | |
| 7,132,664 B1 * | 11/2006 | Crosetto ..................... | 250/367 |
| 7,265,352 B2 | 9/2007 | Muehllehner et al. | |
| 2003/0161521 A1 * | 8/2003 | Newport et al. ............ | 382/131 |
| 2005/0253074 A1 * | 11/2005 | Jones et al. ............ | 250/363.04 |
| 2006/0104410 A1 * | 5/2006 | Sauer et al. .................... | 378/4 |
| 2006/0151705 A1 | 7/2006 | Manjeshwar et al. | |
| 2006/0178575 A1 * | 8/2006 | Piacsek et al. .............. | 600/413 |
| 2006/0266946 A1 * | 11/2006 | Defrise et al. ......... | 250/363.03 |

OTHER PUBLICATIONS

A Rahmim et al., "Statistical List-Mode Image Reconstruction for the High Resolution Research Tomograph", Phys. Med. Biol. 49 (2004) 4239-4258.
A Malton et al., "Three-dimensional PET Reconstruction With Time-Of-Flight Measurement", Phys. Med. Biol., 1992, vol. 37, No. 3, 717-729.
Lucas Parra et al., "List-Mode Likelihood: Algorithm and Image Quality Estimation Demonstrated on 2-D PET", IEEE Transaction on Medical Imaging, vol. 17, No. 2, Apr. 1998, 232-235.
John M. Ollinger et al., "Positron Emission Tomography", IEEE Signal Processing Magazine, 14(1):43-55, Jan. 1997.

(Continued)

*Primary Examiner*—David Porta
*Assistant Examiner*—Marcus H Taningco
(74) *Attorney, Agent, or Firm*—Hunton & Williams, LLP

(57) ABSTRACT

The invention is directed to a technique for reconstructing PET scan images. According to one embodiment, the invention relates to a method for reconstructing PET scan images. The method comprises: detecting a plurality of coincidence events in a PET scanner; storing data associated with the plurality of coincidence events in a chronological list based on a detection time for each of the plurality of coincidence events; generating correction data based on scatter coincidence events and random coincidence events in the plurality of coincidence events; and reconstructing one or more PET scan images based at least in part on the chronological list of data and the correction data.

33 Claims, 5 Drawing Sheets

OTHER PUBLICATIONS

U.S. Appl. No. 60/638,532, filed Jul. 13, 2006, Defrise et al.

Harrison H. Barrett et al.; List-mode Likelihood; Optical Society of America, vol. 14, No. 11, Nov. 1997; pp. 2914-2923.

A. J. Reader et al.; Fast accurate iterative reconstruction for low-statistics positron volume imaging; Phys. Med. Biol.; vol. 43; 1998; pp. 835-846.

John M. Ollinger.; Model-based scatter correction for fully 3D PET; Phys. Med. Biol.; vol. 41; 1996; pp. 153-176.

David Brasse et al.; Correction Methods for Random Coincidences in Fully 3D Whole-Body PET: Impact on Data and Image Quality; The Journal of Nuclear Medicine; vol. 46 No. 5; May 2005; pp. 859-867.

Thomas E. Nichols et al.; Spatiotemporal Reconstruction of List-Mode PET Data; IEEE Transactions on Medical Imaging, vol. 21, No. 4, Apr. 2002; pp. 396-403.

Mikael Steen & Per Uhlen, Development of a Time-of-Flight and 3D demonstration set-up for position emission tomography (1998) (Master's Thesis, Royal Institute of Technology, Stockholm).

M. Bergstrom et al.; "Correction for Scattered Radiation in a Ring Detector Positron Camera by Integral Transformation of the Projections"; Journal of Computer Assisted Tomography, vol. 7(1), pp. 42-50; Feb. 1983.

W. Craig Barker et al.; "Randoms Estimation for List-mode Reconstruction for the ECAT HRRT"; IEEE, pp. 3510-3513, 2004.

Charles W. Stearns et al.; "Random Coincidence Estimation from Single Events Rates on the Discovery ST PET/CT Scanner"; IEEE, pp. 3067-3069, 2004.

Maurizio Conti et al.; "Implementation of Time-of-Flight on CPS HiRez PET Scanner"; IEEE, pp. 2796-2800, 2004.

Corinne J. Groiselle et al.; "3D PET List-Mode Iterative Reconstruction Using Time-Of-Flight Information"; IEEE, pp. 2633-2638; 2004.

* cited by examiner

TECHNIQUE FOR RECONSTRUCTING PET SCAN IMAGES

BACKGROUND OF THE INVENTION

The present invention relates generally to the field of medical imaging and more particularly to a technique for reconstructing PET scan images.

Positron emission tomography (PET) is a technique commonly used in clinical medicine and biomedical research to create images of a living body in its active state. PET scanners can produce images that illustrate various biological process and functions. In a PET scan, the patient is initially injected with a radiotracer. A radiotracer comprises bio-chemical molecules that are tagged with a positron emitting radioisotope and can participate in certain physiological processes in the patient's body. Typical positron-emitting PET isotopes include $^{11}C$, $^{13}N$, $^{15}O$ and $^{18}F$. When positrons are emitted within the body, they combine with electrons in the neighboring tissues and annihilate. The annihilation events usually result in pairs of gamma photons, with 511 keV of energy each, being released in opposite directions. The gamma photons are then detected by a detector ring like the one shown in FIG. 1. The detector ring 100 may comprise a number of detectors or detector channels (e.g., 11, 12, 13, and 14 etc.) each having a scintillator block and a photomultiplier tube (PMT). For example, detector 11 comprises a scintillator block 112 and a PMT 114, detector 12 comprises a scintillator block 122 and a PMT 124, and so on. In another configuration, a detector block may comprise a matrix of individual scintillator crystals which are read out by a matrix of PMTs. For example, scintillator block 122 may comprise 36 crystals arranged in a square which are read-out by a 2×2 matrix of PMTs. The matrix of PMTs is able to identify an individual scintilator crystal in which a gamma photon is detected.

In operation, a patient 102, who has been injected with a PET radiotracer, may be positioned in the detector ring 100. One pair of gamma photons from a body part 104 may be detected by 2 detectors 11 and 12. The pair of detectors constitutes a line of response (LOR) 116. Another pair of gamma photons from the body part 104 may be detected along another LOR 136. When detected, each of the gamma photons produces numerous optical photons inside its corresponding scintillation blocks 112 and 122. Along the LOR 116, the gamma photons may cause substantially simultaneous scintillations in the scintillator blocks 112 and 122. These scintillations may then be amplified and converted into electrical signals by the PMTs 114 and 124 respectively. Subsequent electronic circuitry may determine whether these substantially simultaneous scintillations are coincidence events, that is, radiation events originating from the same annihilation event in the patient 102's body. Data associated with coincidence events along a number of LORs may be collected and further processed to reconstruct two-dimensional (2-D) tomographic images. Some modern PET scanners can operate in a three-dimensional (3-D) mode, where coincidence events from different detector rings positioned along the axial direction are counted to obtain 3-D tomographic images. An exemplary PET scanner with multiple detector rings is shown in FIG. 2, where the PMTs are not shown. As shown, the PET scanner 200 comprises three detector rings 22, 24 and 26.

Traditionally, data associated with coincidence events are stored in the form of sinograms based on their corresponding LORs. For example, in a 2-D PET scanner like the one illustrated in FIG. 3, if a pair of coincidence events are detected by two opposite detectors 302 and 304, an LOR may be established as a straight line 306 linking the two detectors. This LOR may be identified by two coordinates (r, θ), wherein r is the radial distance of the LOR from the center axis of the detector ring 300, and θ is the trans-axial angle between the LOR and the X-axis. The detected coincidence events may be recorded in a 2-D matrix λ(r, θ). As the PET scanner continues to detect coincidence events along various LORs, these events may be binned and accumulated in their corresponding elements in the matrix λ(r, θ). The result is a 2-D sinogram λ(r, θ), each element of which holds an event count for a specific LOR. In a 3-D PET scanner, an LOR is defined by four coordinates (r, θ, φ, z), wherein the third coordinate φ is the axial angle between the LOR and the center axis (or Z-axis as shown in FIG. 2) of the detector rings and z is the distance of the LOR from the center of detector along the Z-axis. Typically the third and fourth co-ordinates are combined into only one variable, v, which can define both φ and z coordinates. In this case, the detected coincidence events are stored in a 3-D sinogram λ(r, θ, v).

In addition to the true coincidence events described above, two other types of coincidence events are detected by the PET scanner, and these events confound the data collection and image reconstruction process. The first type of confounding events arises because the annihilation photons may scatter as they travel out of the patient. If one or both of the annihilation photons scatter, and are subsequently detected in coincidence, they will register a coincidence event along an LOR that does not correspond to the site of the annihilation event. These events are called "scattered coincidences." A scattered coincidence may be differentiated from a true coincidence in that scattered photons have energy less than 511 keV. However, due to practical considerations in the design of PET detectors, the energy of each detected photon cannot be measured exactly, and some scattered photons, and therefore some scattered coincidences, are accepted by the scanner. It therefore becomes necessary in the reconstruction process to estimate the contribution of scattered coincidences to the acquired sinograms. Several well-known methods exist for scattered coincidence estimation for both 2D and 3D sinogram sets.

The second type of confounding coincidence event arises from the essentially simultaneous detection of two photons that arose from two different annihilation events that occur at nearly the same time. These coincidences are called "random coincidences." The contribution of random coincidences may be reduced by reducing the timing window used to define the simultaneous detection of the coincident photons, but some random coincidences will be accepted by the scanner. The rate of random coincidence acceptance may be estimated by two well-known methods. In one of these methods, known as "Delayed Window Method", the signal from one of the detectors is delayed in time, and a second coincidence circuit finds coincidences between this signal and the undelayed signal from the second detector. The expected rate of coincidences from this delayed coincidence channel is equal to the expected rate of random coincidences from the undelayed, or "prompt," channel. In the second method of random coincidence estimation, known as the "Randoms from Singles Method", the detected event rate for each detector is measured and used to predict the random coincidence rate in the prompt channel.

The sinogram data collected by a PET scanner is not an image that illustrates the spatial distribution of the radiotracer inside the patient. Certain mathematical operations must be performed on the sinogram data to transform them into images. The process of generating images is called "tomographic image reconstruction." The image reconstruction techniques are based on the fact that, when a coincidence event is detected by two detectors, the emission point must have occurred somewhere along the line (i.e., LOR) joining the two detectors. Various techniques are known in the literature for tomographic image reconstruction. The techniques range from analytical methods which are computationally efficient to iterative reconstruction techniques which can be computationally demanding.

Two standard iterative reconstruction algorithms used in PET image reconstruction are maximum likelihood expectation maximization (MLEM) and ordered subsets expectation maximization (OSEM), which can be described by the following iterative update equations (1) and (2) respectively.

$$\hat{F}_j^{k+1} = \frac{\hat{F}_j^k}{\sum_i P_{ij}} \sum_i \frac{\lambda_i P_{ij}}{\sum_{j'} P_{ij'} \hat{F}_{j'}^k + S_i + R_i} \quad (1)$$

$$\hat{F}_j^{k,m+1} = \frac{\hat{F}_j^{k,m}}{\sum_{i \in s_m} P_{ij}} \sum_{i \in s_m} \frac{\lambda_i P_{ij}}{\sum_{j'} P_{ij'} \hat{F}_{j'}^k + S_i + R_i} \quad (2)$$

wherein $\hat{F}_j^k$ is an estimate of the image (e.g., number of annihilation events) at location j on the $k^{th}$ itheration, $\lambda_i$ is the number of prompt coincidence events detected by the $i^{th}$ LOR, $S_i$ is the number of estimated scatter events detected by the $i^{th}$ LOR, $R_i$ is the number of estimated random events detected by the $i^{th}$ LOR, $P_{ij}$ is a system matrix that determines the probability that activity from location j is detected by the $i^{th}$ LOR, and $S_m$ is the $m^{th}$ subset of LORs.

These equations represent iteration steps of: (a) transforming an estimate of the reconstructed image into an estimated sinogram, (b) adding the estimate of the scatter and random coincidences, (c) comparing the estimated sinogram with the measured prompts sinogram to generate a correction sinogram, (d) generating a correction to the estimated image by back-projecting the correction sinogram, and (e) updating the estimated image based on the correction.

A well-known improvement to PET detection methods is Time-Of-Flight PET (TOF PET), where, in addition to coincidence detection, the difference in the detection time of the individual photons in the coincidence pair is measured. In TOF PET, upon detection of a radiation event (e.g., a gamma photon), the scintillator block at the detection locale time-stamps the detected radiation event. Since both the photons travel at the speed of light, the difference in their time stamps can be used to better localize the annihilation event along the LOR. In a TOF-PET scanner, the position of the emission event relative to the midpoint between the two detectors is determined from $$x = c(t_1 - t_2)/2 \quad (3)$$

where, $t_1$ and $t_2$ are the detection times of the two photons and c is the speed of light. In reality, TOF information can only be measured within a certain uncertainty dictated by the timing resolution of the detectors. Consequently, the emission event can be localized probabilistically to a short line segment. The uncertainty in event localization is given by $$\Delta x = c \Delta t / 2 \quad (4)$$

where $\Delta x$ is the location uncertainty and $\Delta t$ is the timing resolution. In non-TOF PET, the detection times are ignored and the annihilation is equally probable to have occurred along the full extension of the LOR. Incorporation of the time of flight information helps localize the actual emission point for each event, thereby reducing statistical uncertainty in the reconstructed images.

The sinogram data in TOF PET, have an additional coordinate, $\Delta t$, which is the difference in the time stamps of two detected photons. Therefore TOF sinogram can be $\lambda(r, \theta, \Delta t)$ for a 2-D PET scanner and $\lambda(r, \theta, v, \Delta t)$ for a 3-D PET scanner. The added dimensions of the sinogram data in 3-D PET or TOF PET can greatly increase computational demands in the tomographic image reconstruction. For example, in one particular 3-D PET scanner at one level of quantization, an LOR may have 249 possible values for the radial distance r, 210 possible values for the trans-axial angle $\theta$, and 553 possible values for the axial angle $\phi$. In TOF mode, with a time-stamp quantization of 250 picoseconds (ps), 21 sinogram bins are required along the t dimension to cover a 70 cm field of view (FOV). As a result, this 3-D TOF PET scanner distinguishes over $600 \times 10^6$ different LORs and its sinogram $\lambda(r, \theta, \phi, t)$ contains over $6 \times 10^8$ elements. For another detector geometry, a sinogram can have about $1.4 \times 10^9$ elements. In addition, considering that image reconstruction will require a sinogram each for prompts, scatter and randoms coincidences, this can result in a significant computational and data storage burden. With the development of PET technology, the number of LORs or the size of the sinograms are expected to increase even more.

On the other hand, the PET sinograms usually are sparsely populated. For example, a 300-second data acquisition at an event count rate of 50 kcps (kilo counts per second) will result in only 15 million detected events. For a sinogram with over $6 \times 10^8$ elements, only a small fraction of the sinogram elements are non-zero. However, during image reconstruction, computations are performed on all the sinogram elements, whether zero or non-zero, resulting in a considerable waste of computation resources on empty sinogram bins.

List-mode image reconstruction has been proposed as a computationally efficient and data storage friendly solution for conventional (non-TOF) scanners. See, e.g., Lucas Parra, Harrison Barrett, "*List-Mode Likelihood: EM Algorithm and Image Quality Estimation Demonstrated on 2-D PET*", IEEE Transaction in Medical Imaging, Vol. 17, No. 2, pp. 228-235, April 1998. Equations (1) and (2) are typically applied to sinogram data in known PET image reconstruction methods. In the list-mode reconstruction algorithm, an LOR may be considered infinitely thin. Thus, the probability of detecting two pairs of coincidence events by the same LOR is negligibly small. In other words, one LOR can see either one pair of coincidence events or none at all. The value of $\lambda_i$ is 1 if a pair of coincidence events is detected by the $i^{th}$ LOR. Otherwise, the value of $\lambda_i$ is zero. Based on this observation, the iterative update equations for list-mode MLEM and OSEM may be equations (5) and (6) respectively.

$$\hat{F}_j^{k+1} = \frac{\hat{F}_j^k}{\sum_i P_{ij}} \sum_{i, \lambda_i = 1} \frac{P_{ij}}{\sum_{j'} P_{ij'} \hat{F}_{j'}^k} \quad (5)$$

-continued $$\hat{F}_j^{k,m+1} = \frac{\hat{F}_j^{k,m}}{\sum_{i \in S_m} P_{ij}} \sum_{i \in S_m, \lambda_i=1} \frac{P_{ij}}{\sum_{j'} P_{ij'} \hat{F}_{j'}^k} \quad (6)$$

These adapted iterative update equations may be applied to the list of coincidence event data to reconstruct PET images. Unlike the sinogram-based reconstruction, the adapted equation (5) uses an individual event (or photon) for each iterative step. And the adapted equation (6) uses a subset (or a group of photons) for each iterative step. However, the above formulations take into account only the true coincidence events, ignoring the scatter and random events. That is, the existing list-mode iterative image reconstruction methods do not guarantee reliable results in situations where the random and scattered coincidences form a substantial fraction of the acquired data set.

Rahmim et al [A Rahmim, M Lenox, A J Reader, C Michel, Z Burbar, T J Ruth and V Sossi, "*Statistical list-mode image reconstruction for the high resolution research tomography*" Physics in Medicine and Biology. 49, pp 4239-4258, 2004] have proposed using the delayed window method for random coincidences correction for conventional (NON TOF) list mode reconstruction. The method they propose, while achieving random coincidences corrections, has two drawbacks. First, the method involves the acquisition and storage of a separate list of events that approximate the random coincidences. As a result the memory storage as well as data access requirements for image generation are increased. Second, since the random coincidences estimate is computed from a noisy acquisition, it can result in increased image noise.

In view of the foregoing, it would be desirable to provide a more practical and efficient solution for TOF-PET image reconstruction.

BRIEF SUMMARY OF THE INVENTION

The present invention is directed to a technique for reconstructing TOF-PET scan images that overcomes drawbacks of known systems and methods.

According to one embodiment, the invention relates to a method for reconstructing TOF-PET scan images. The method comprises: detecting a plurality of coincidence events in a PET scanner; storing data associated with the plurality of coincidence events in a chronological list based on a detection time for each of the plurality of coincidence events; generating correction data based on scatter coincidence events and random coincidence events in the plurality of coincidence events; and reconstructing one or more TOF-PET scan images based at least in part on the chronological list of data and the correction data.

According to another embodiment, the invention relates to a system for reconstructing TOF-PET scan images. The system comprises: means for detecting a plurality of coincidence events in a TOF-PET scanner; means for storing data associated with the plurality of coincidence events in a chronological list based on a detection time for each of the plurality of coincidence events; means for generating correction data based on scatter coincidence events and random coincidence events in the plurality of coincidence events; and means for reconstructing one or more TOF-PET scan images based at least in part on the chronological list of data and the correction data.

According to yet another embodiment, the invention relates to a computer readable medium having code for causing a processor to reconstruct TOF-PET scan images. The computer readable medium comprises: code adapted to detecting a plurality of coincidence events in a TOF-PET scanner; code adapted to store data associated with the plurality of coincidence events in a chronological list based on a detection time for each of the plurality of coincidence events; code adapted to generate correction data based on scatter coincidence events and random coincidence events in the plurality of coincidence events; and code adapted to reconstruct one or more TOF-PET scan images based at least in part on the chronological list of data and the correction data.

According to still another embodiment, the invention relates to a method for reconstructing PET scan images. The method comprises: detecting a plurality of coincidence events in a TOF-PET scanner; storing data associated with the plurality of coincidence events in a sinogram, wherein each element of the sinogram corresponds to a line of response and only non-zero elements of the sinogram are stored; generating correction data based on scatter coincidence events and random coincidence events in the plurality of coincidence events; and reconstructing one or more TOF-PET scan images based at least in part on the non-zero elements of the sinogram and the correction data.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF THE INVENTION

Reference will now be made in detail to exemplary embodiments of the invention, examples of which are illustrated in the accompanying drawings.

Embodiments of the present invention may improve TOF PET image reconstruction by collecting detected coincidence events in a list mode and adapting the reconstruction algorithm to the list mode. Instead of being binned into sinograms, the detected events may be stored as a list of coincidence event pairs, along with information about the LORs along which they were detected, the difference in the times stamps of the two photons, and potentially other information like the energy of the individual photons. Embodiments of the improved list-mode TOF PET image reconstruction method may further provide corrections to the list-mode data to minimize interferences from scatter and random events.

Figure 1:
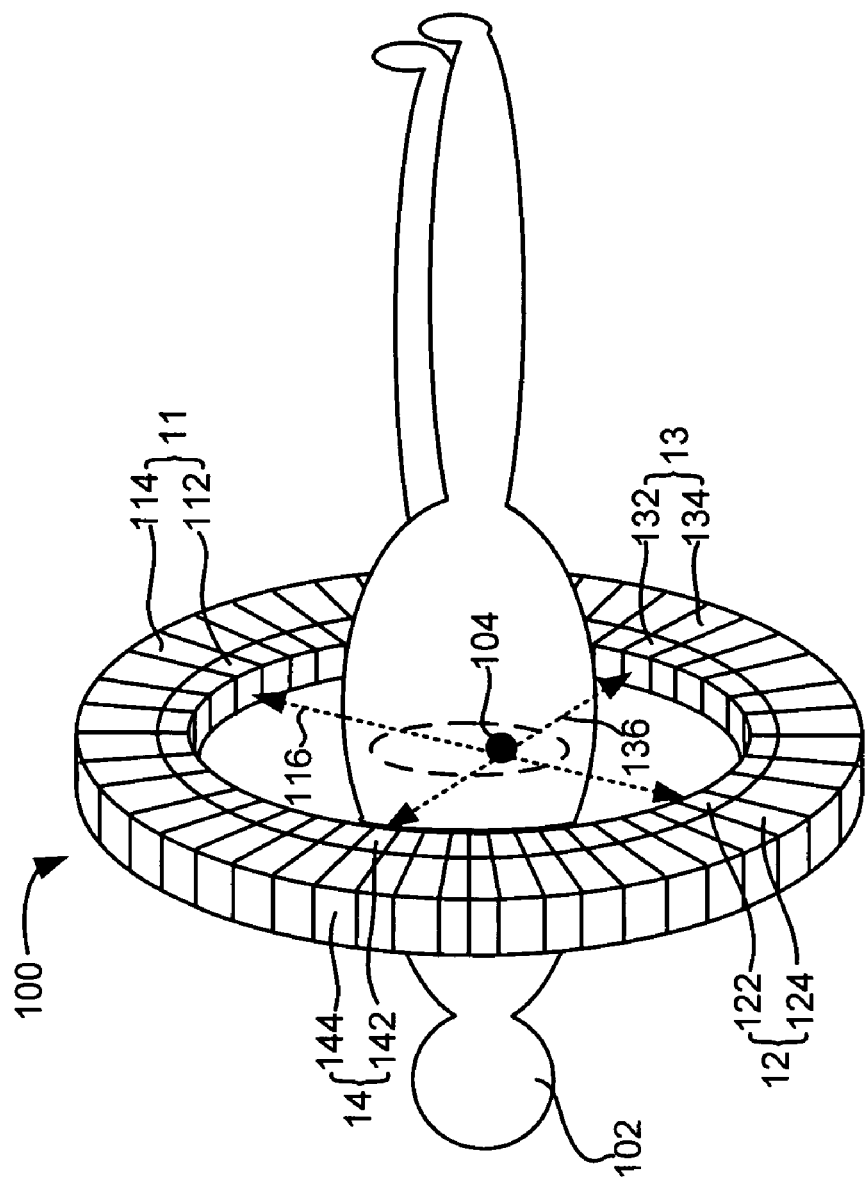
FIG. 1 is a concept view of a PET system.
Figure 2:
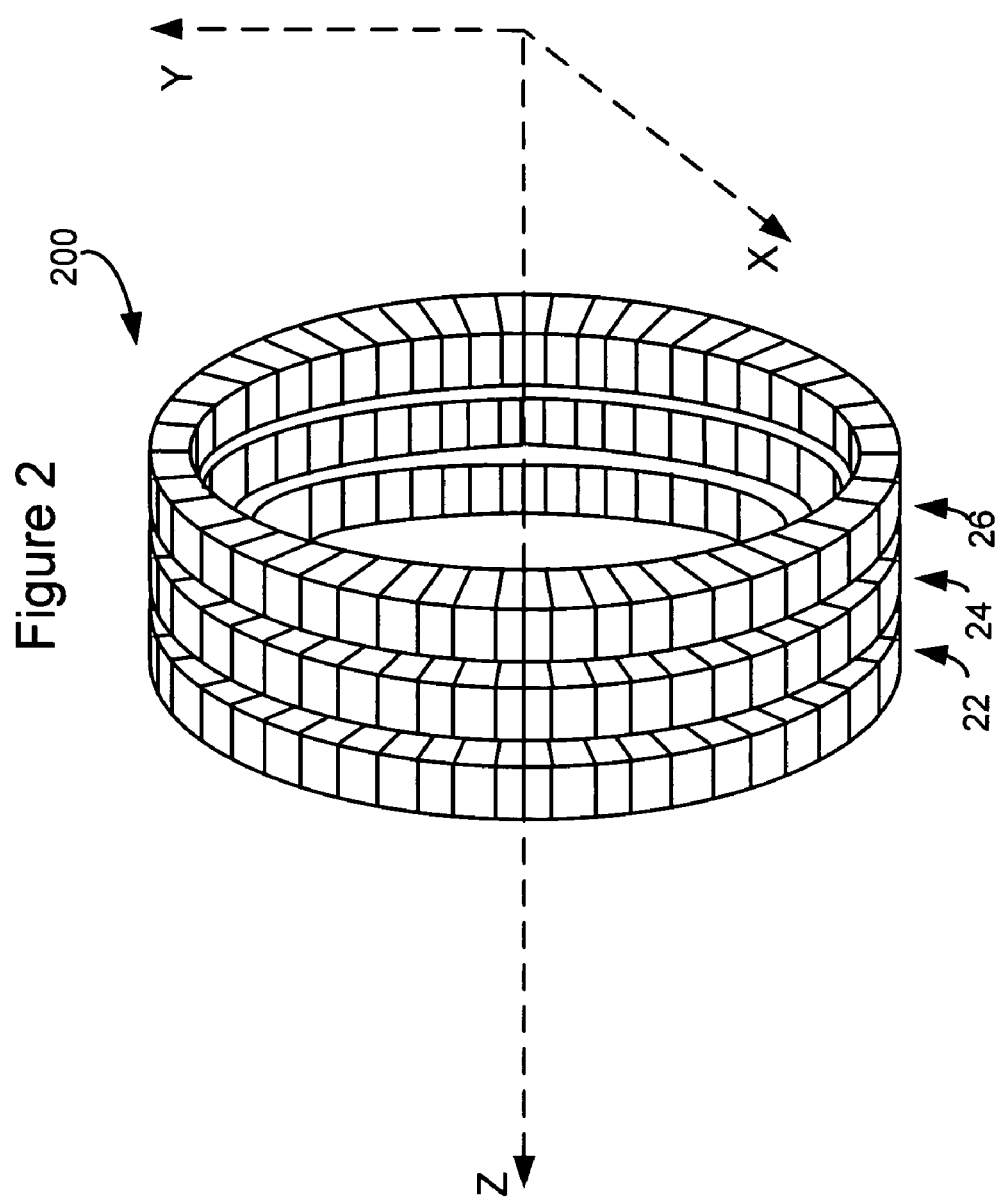
FIG. 2 illustrates a known 3-D PET system.
Figure 3:
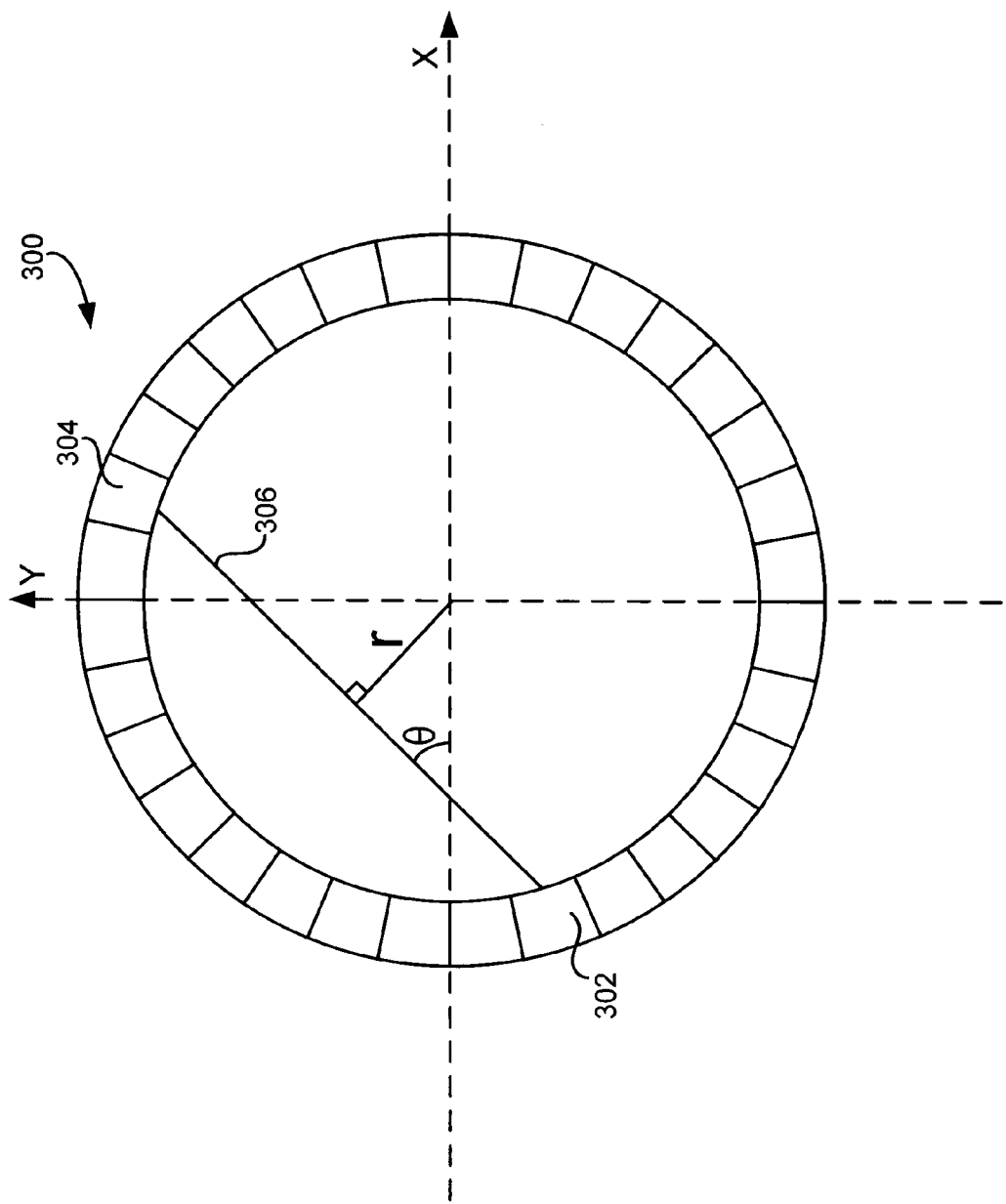
FIG. 3 illustrates an exemplary line-of-response in a PET system.
Figure 4:
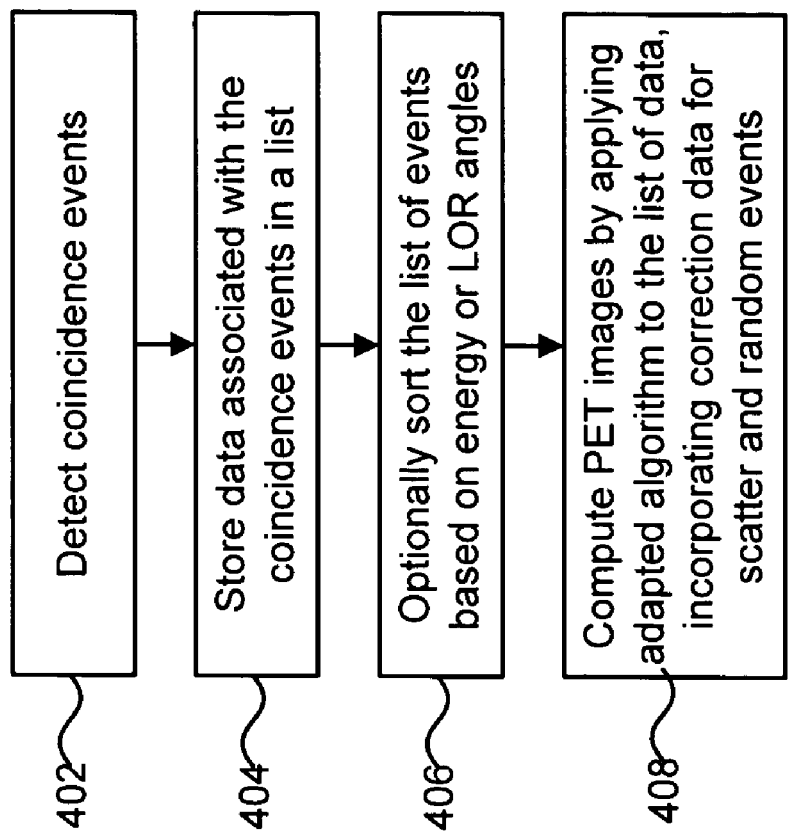
FIG. 4 is a flow chart illustrating an exemplary method for reconstructing PET scan images according to an embodiment of the present invention.

FIG. 4 is a flow chart illustrating an exemplary method for reconstructing PET scan images according to an embodiment of the present invention.

In step 402, coincidence events may be detected in a PET scanner. Individual detectors in the PET scanner may detect gamma photons (individual events) resulting from positron annihilations in the imaged object. These individual events may be recorded if they fall in certain energy window(s). Each event may be assigned a location ID and a time-stamp to indicate the detector in which it was detected and time of detection, respectively. Then the event data may be processed to identify coincidence events. Two events that are detected within a pre-determined coincidence time window may be determined to be coincidence events (including true coincidence events as well as scatter and random coincidence events).

In step 404, data associated with the coincidence events may be stored in a chronological list. That is, as the coincidence events are detected and identified, their data may be sequentially stored in a list according to their time of detection. The coincidence event data may comprise, for example, coordinates for the LOR (e.g., radial distance, angles), event time-stamps, and incident photon energy. Rather than being histogrammed, the coincidence event data may now be arranged chronologically as they become available.

In step 406, the list of coincidence event data may be optionally sorted based on one or more criteria. For example, the data may be sorted based on incident photon energy. Coincidence events that record certain photon energy may be grouped together to form a subset to facilitate an ordered subsets expectation maximization (OSEM) algorithm as described below. The data may also be sorted based on LOR angle, for example.

In step 408, PET images may be computed by applying an adapted algorithm to the list of coincidence event data. Iterative algorithms are commonly used for PET image reconstruction. An iterative reconstruction algorithm usually involves forward and backward projection of the coincidence event data.

According to an exemplary embodiment of the invention, for a list-mode reconstruction, an LOR may be considered infinitely thin. Thus, the probability of detecting two pairs of coincidence events by the same LOR is negligibly small. In other words, one LOR can see either one pair of coincidence events or none at all. The value of $\lambda_{i,t}$ (the coincidence event detected along the $i^{th}$ LOR in the $i^{th}$ time bin) is 1 if a pair of coincidence events is detected by the $i^{th}$ LOR. Otherwise, the value of $\lambda_{i,t}$ is zero. Based on this observation, the iterative update equations for list-mode MLEM and OSEM may be equations (7) and (8) respectively.

$$F_j^{k+1} = \frac{F_j^k}{\sum_{i,t} P_{ijt}} \sum_{i,t} \frac{P_{ijt}}{\sum_{j'} P_{ij't} F_j^k} \quad (7)$$

$$F_j^{k+1} = \frac{F_j^k}{\sum_{i \in s_m, t} P_{ijt}} \sum_{i \in s_m, t} \frac{P_{ijt}}{\sum_{j'} P_{ij't} F_j^k} \quad (8)$$

where $P_{ijt}$ is the probability that the emission event from the $j^{th}$ pixel was detected along the $i^{th}$ LOR and in the $i^{th}$ time bin. $P_{ij}$ and $P_{ijt}$ are related by the following expression $$P_{ijt} = p(j|t,i) P_{ij} \quad (9)$$

where p(j|t,i) is the probability distribution function which describes the location uncertainty along the $i^{th}$ LOR for the $i^{th}$ time bin. These adapted iterative update equations may be applied to the list of coincidence event data to reconstruct TOF-PET images. Unlike the sinogram-based reconstruction, the adapted equation (7) uses an individual event (or photon) for each iterative step. And the adapted equation (8) uses a subset (or a group of photons) for each iterative step.

Equations (7) and (8) do not consider contamination or interference of the measured data by randoms and scatter coincidences. To correct for random coincidences a model-based approach may be adopted. The random coincidences in the $i^{th}$ bin along the $i^{th}$ LOR may be given by $$R_{it} = (\tau_{LSB}/\tau_{acq}) d_1 d_2 \quad (10)$$

where $\tau_{LSB}$ is a time stamp quantization (i.e., the smallest time unit distinguishable by the PET system), $\tau_{acq}$ is the acquisition coincidence window, and $d_1$ and $d_2$ are the number of single photons detected by the two detectors corresponding to the $i^{th}$ LOR. Equations 5 and 6 may now be modified to include randoms correction as follows $$F_j^{k+1} = \frac{F_j^k}{\sum_{i,t} P_{ijt}} \sum_{i,t} \frac{P_{ijt}}{\sum_{j'} P_{ij't} F_j^k + (\tau_{LBS}/\tau_{acq}) d_{i1} d_{i2}} \quad (11)$$

$$F_j^{k+1} = \frac{F_j^k}{\sum_{i \in s_m, t} P_{ijt}} \sum_{i \in s_m, t} \frac{P_{ijt}}{\sum_{j'} P_{ij't} F_j^k + (\tau_{LBS}/\tau_{acq}) d_{i1} d_{i2}} \quad (12)$$

For a PET scanner that has n detector crystals, only n values of d need to be stored. Therefore the memory storage requirement for storing the random events is minimal. The random coincidence events along an LOR may be computed in real-time.

A model based scatter estimation (MBSE-TOF) technique for TOF-PET was disclosed in U.S. patent application Ser. No. 11/040,088, entitled "Method and System for Scattered Coincidence Estimation in a Time-of-Flight Positron Emission Tomography System," filed Jan. 21, 2005, which is incorporated herein in its entirety. To perform scatter correction, the list-mode data may be first binned into sinograms discarding TOF information. These non-TOF sinograms may be input to the MBSE-TOF algorithm, the output of which are TOF scatter sinograms. Since scatter sinograms are typically smooth, they do not have to be stored at full resolution. Instead, the scatter sinograms from MBSE-TOF may be down-sampled and stored. During list-mode image reconstruction, the scatter coincidences along a LOR may be computed by interpolation of the down-sampled TOF-scatter sinograms. Therefore, Equations (7) and (8) may now be modified as follows to include the scatter correction:

$$F_j^{k+1} = \frac{F_j^k}{\sum_{i,t} P_{ijt}} \sum_{i,t} \frac{P_{ijt}}{\sum_{j'} P_{ij't} F_j^k + U[DS_{i,t}]} \quad (13)$$

$$F_j^{k+1} = \frac{F_j^k}{\sum_{i \in s_m, t} P_{ijt}} \sum_{i \in s_m, t} \frac{P_{ijt}}{\sum_{j'} P_{ij't} F_j^k + U[DS_{i,t}]} \quad (14)$$

where DS is the down-sampled scatter sinogram and U[ ] represents the interpolation operator.

Equations (15) and (16) describe the update equations for list-mode reconstruction that includes both randoms and scatter correction:

$$F_j^{k+1} = \frac{F_j^k}{\sum_{i,t} P_{ijt}} \sum_{i,t} \frac{P_{ijt}}{\sum_{j'} P_{ij't} F_j^k + U[DS_{i,t}] + (\tau_{LBS}/\tau_{acq})d_{i1}d_{i2}} \quad (15)$$

$$F_j^{k+1} = \frac{F_j^k}{\sum_{i \in S_m, t} P_{ijt}} \sum_{i \in S_m, t} \frac{P_{ijt}}{\sum_{j'} P_{ij't} F_j^k + U[DS_{i,t}] + (\tau_{LBS}/\tau_{acq})d_{i1}d_{i2}} \quad (16)$$

As mentioned earlier, the list of coincidence event data may be sorted to create subsets for implementation of the OSEM algorithm. Take energy-sorted subsets for an example. PET detectors may detect true coincidences as well as random and scattered coincidences. The photon pairs detected which are true coincidences have an energy of exactly 511 KeV. The scattered photons lose some energy when they interact with the body and have less than 511 KeV of energy. If the data are sorted based on incident photon energy, a first subset may be formed to include photons that have an energy of exactly 511 eV, a second subset may include those having an energy of approximately 500 eV, and so on. Then, the first energy-sorted subset may be used in the first round of OSEM iteration, the second subset may be used in the second round of OSEM iteration, and so on. Further, the contribution of the different subsets may be weighted by a parameter that depends on the energy of the subset of detected photons. Based on this scheme, the update equations for energy-weighted list-mode MLEM and OSEM may be given by:

$$\hat{F}_j^{k+1} = \hat{F}_j^k + \frac{\gamma(E)\hat{F}_j^k}{\sum_i P_{ij}} \sum_{i,\lambda_i=1} P_{ij} \left\{ \frac{1}{\left(\sum_{j'} P_{ij'} \hat{F}_{j'}^k + U[DS_{i,t}] + (\tau_{LBS}/\tau_{acq})d_{i1}d_{i2}\right)} - 1 \right\} \quad (17)$$

$$\hat{F}_j^{k,m+1} = \hat{F}_j^{k,m} + \frac{\gamma(E)\hat{F}_j^{k,m}}{\sum_{i \in S_m} P_{ij}} \sum_{i \in S_m, \lambda_i=1} P_{ij} \left( \frac{1}{\left(\sum_{j'} P_{ij'} \hat{F}_{j'}^k + U[DS_{i,t}] + (\tau_{LBS}/\tau_{acq})d_{i1}d_{i2}\right)} - 1 \right) \quad (18)$$

where $\gamma(E)$ is a weighting parameter that depends on the energy of the detected photons. In can be seen that if all the photons are weighted equally, i.e., $\gamma(E)=1$ for all energies, Equations (17) and (18) are exactly the same as Equations (15) and (16) respectively. By using the energy-weighted list-mode reconstruction scheme, the true coincidence events play a bigger role in the image formation and improve image quality.

It should be noted that the coincidence event data may be fed to the iterative update equations as soon as the data become available. Since the coincidence event data are being collected and stored chronologically, it may not be necessary to wait for the data acquisition to finish before starting the image reconstruction process. Instead, the reconstruction iteration may start soon after the data acquisition starts, making it possible to produce reconstructed PET images soon after the scanning is done. To incorporate corrections for scatter coincidence events, scatter sinograms may have to be generated first. However, generation of the scatter sinograms may only cause a short delay before the full list-mode image reconstruction can start. This minor delay may be a small price to pay for a substantially improved PET image with minimum interference from scatter events.

According to another embodiment of the present invention, detected TOF PET coincidence events may be binned in a sinogram. However, only those LOR bins that have one or more event counts may be stored such that only those LORs will be operated upon to reconstruct the PET scan images. Accordingly, the iterative update equations for MLEM and OSEM may be equations (19) and (20) respectively.

$$\hat{F}_j^{k+1} = \frac{\hat{F}_j^k}{\sum_i P_{ij}} \sum_{i,\lambda_i>0} \frac{\lambda_i P_{ij}}{\sum_{j'} P_{ij'} \hat{F}_{j'}^k + U[DS_{i,t}] + (\tau_{LBS}/\tau_{acq})d_{i1}d_{i2}} \quad (19)$$

$$\hat{F}_j^{k,m+1} = \frac{\hat{F}_j^{k,m}}{\sum_{i \in S_m} P_{ij}} \sum_{i \in S_m,\lambda_i>0} \frac{\lambda_i P_{ij}}{\sum_{j'} P_{ij'} \hat{F}_{j'}^k + U[DS_{i,t}] + (\tau_{LBS}/\tau_{acq})d_{i1}d_{i2}} \quad (20)$$

The technique for reconstructing PET scan images in accordance with the present invention may be typically implemented in a computer-based system. The computer-based system may comprise one or more processors and/or computers capable of data manipulation, logic operation and mathematical calculation. The system may further comprise one or more storage devices for storing and managing PET scan raw data and coincidence event data, for example. In addition, a number of user interfaces may be provided for a user to initiate a reconstruction process and to view reconstructed PET scan images. The technique may be implemented on computers or computer networks.

Figure 5:
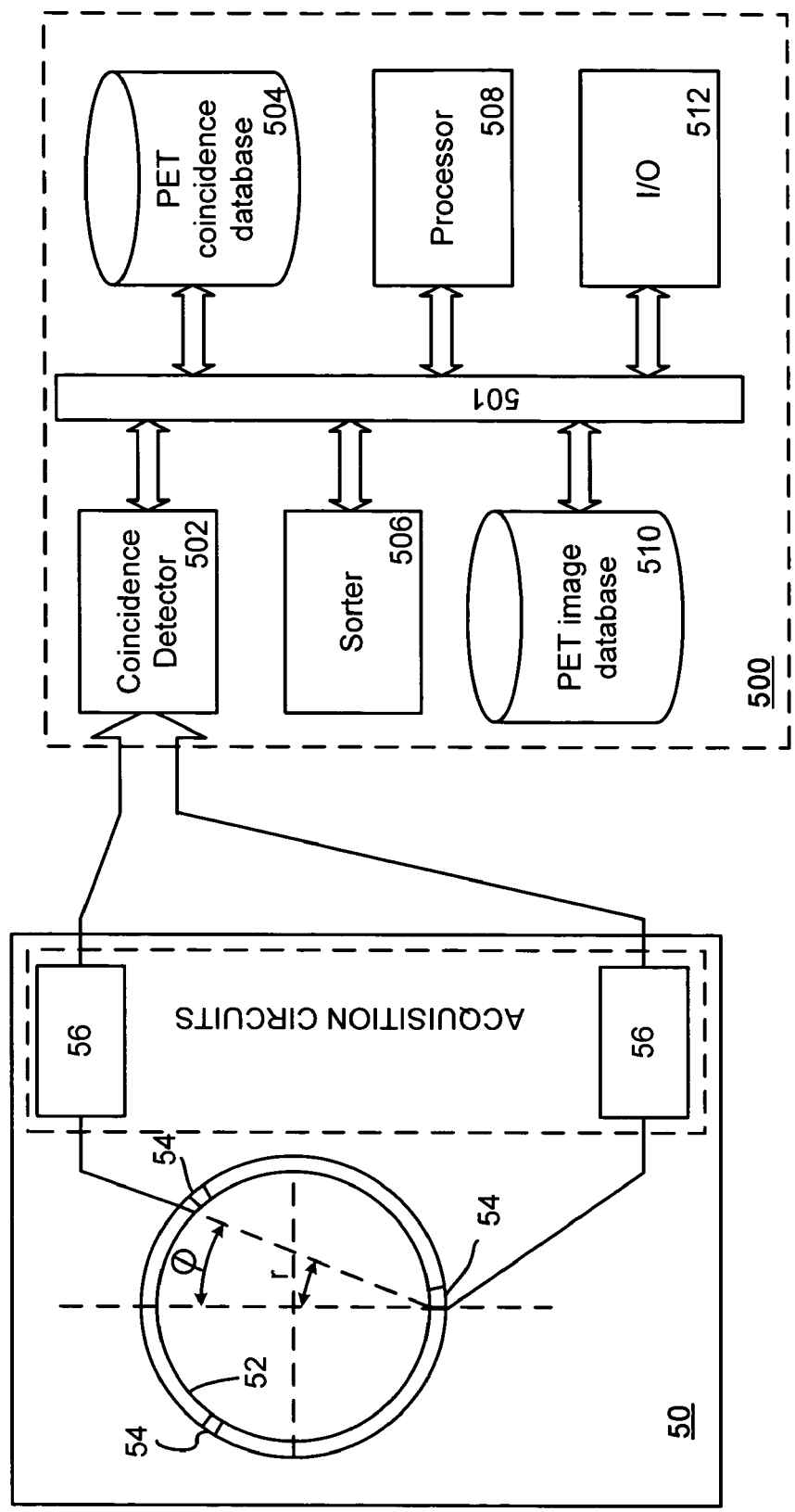
FIG. 5 is a block diagram illustrating an exemplary system for reconstructing PET scan images according to an embodiment of the present invention.

FIG. 5 is a block diagram illustrating an exemplary system 500 for reconstructing PET scan images according to an embodiment of the present invention. The system 500 may be coupled to or part of a PET scanner 50. The PET scanner 50 may comprise one or more detector rings with multiple detectors 54. An array of acquisition circuits 56 may receive from the detectors 54 individual events data and transmit them to the system 500. The system 500 may comprise a coincidence detector 502, a PET coincidence database 504, a sorter 506, a processor 508, a PET image database 510 and an input/output (I/O) module 512, which components may be coupled to one another via an internal data bus 501. The coincidence detector 502 may receive the individual events data and identify coincidence events based on timestamps of the individual events. Data associated with the identified coincidence events may be stored in chronological order in the PET coincidence database 504. The coincidence event data may be optionally sorted by the sorter 506 according to incident photon energy, for example. The processor 508 may apply the above-described algorithms to the chronological list of coincidence data to reconstruct PET scan images. The reconstructed images may be stored in the PET image database 510. The I/O module 512 may provide an interface for a user to control the system 500 and/or the PET scanner 50. The reconstructed PET scan images may also be output via the I/O module 512.

While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalents.

What is claimed is:

1. A method for reconstructing PET scan images, the method comprising:
   detecting a plurality of coincidence events in a PET scanner;
   storing data associated with the plurality of coincidence events in a chronological list based on a detection time for each of the plurality of coincidence events;
   generating correction data based on scatter coincidence events and random coincidence events in the plurality of coincidence events; and
   reconstructing one or more PET scan images based at least in part on the chronological list of data and the correction data.

2. The method according to claim 1, wherein the reconstruction of the one or more PET scan images is based on an iterative reconstruction algorithm.

3. The method according to claim 1, wherein the reconstruction of the one or more PET scan images is based on a maximum likelihood expectation maximization (MLEM) algorithm.

4. The method according to claim 1, wherein the reconstruction of the one or more PET scan images is based on an ordered subsets expectation maximization (OSEM) algorithm.

5. The method according to claim 4, wherein the reconstruction of the one or more PET scan images is based on subsets of the chronological list of data, and the subsets are sorted based on one or more criteria.

6. The method according to claim 5, wherein the subsets are sorted based on energy values of the plurality of coincidence events.

7. The method according to claim 6, wherein the subsets are weighted based on the energy values.

8. The method according to claim 1, wherein the reconstruction of the one or more PET scan images starts before the detection of the plurality of coincidence events is completed.

9. The method according to claim 1, wherein the PET scanner is operating in a time-of-flight (TOF) mode.

10. A system for reconstructing PET scan images, the system comprising:
    means for detecting a plurality of coincidence events in a PET scanner;
    means for storing data associated with the plurality of coincidence events in a chronological list based on a detection time for each of the plurality of coincidence events;
    means for generating correction data based on scatter coincidence events and random coincidence events in the plurality of coincidence events; and
    means for reconstructing one or more PET scan images based at least in part on the chronological list of data and the correction data.

11. The system according to claim 10, wherein the reconstruction of the one or more PET scan images is based on an iterative reconstruction algorithm.

12. The system according to claim 10, wherein the reconstruction of the one or more PET scan images is based on a list-mode maximum likelihood expectation maximization (MLEM) algorithm.

13. The system according to claim 10, wherein the reconstruction of the one or more PET scan images is based on a list-mode ordered subsets expectation maximization (OSEM) algorithm.

14. The system according to claim 10, wherein the reconstruction of the one or more PET scan images starts before the detection of the plurality of coincidence events is completed.

15. The system according to claim 10, wherein the PET scanner is operating in a time-of-flight (TOF) mode.

16. A computer readable medium having code for causing a processor to reconstruct PET scan images, the computer readable medium comprising:
    code adapted to detecting a plurality of coincidence events in a PET scanner;
    code adapted to store data associated with the plurality of coincidence events in a chronological list based on a detection time for each of the plurality of coincidence events;
    code adapted to generate correction data based on scatter coincidence events and random coincidence events in the plurality of coincidence events; and
    code adapted to reconstruct one or more PET scan images based at least in part on the chronological list of data and the correction data.

17. The computer readable medium according to claim 16, wherein the code adapted to reconstruct the one or more PET scan images is based on an iterative reconstruction algorithm.

18. The computer readable medium according to claim 16, wherein the code adapted to reconstruct the one or more PET scan images is based on a maximum likelihood expectation maximization (MLEM) algorithm.

19. The computer readable medium according to claim 16, wherein the code adapted to reconstruct the one or more PET scan images is based on an ordered subsets expectation maximization (OSEM) algorithm.

20. The computer readable medium according to claim 19, wherein the code adapted to reconstruct the one or more PET scan images is based on subsets of the chronological list of data, and the subsets are sorted based on one or more criteria.

21. The computer readable medium according to claim 20, wherein the subsets are sorted based on energy values of the plurality of coincidence events.

22. The computer readable medium according to claim 21, wherein the subsets are weighted based on the energy values.

23. The computer readable medium according to claim 16, wherein the reconstruction of the one or more PET scan images starts before the detection of the plurality of coincidence events is completed.

24. The computer readable medium according to claim 16, wherein the PET scanner is operating in a time-of-flight (TOF) mode.

25. A method for reconstructing PET scan images, the method comprising:

detecting a plurality of coincidence events in a PET scanner;

storing data associated with the plurality of coincidence events in a sinogram, wherein each element of the sinogram corresponds to a line of response and only non-zero elements of the sinogram are stored;

generating correction data based on scatter coincidence events and random coincidence events in the plurality of coincidence events; and reconstructing one or more PET scan images based at least in part on the non-zero elements of the sinogram and the correction data.

26. The method according to claim 25, wherein the reconstruction of the one or more PET scan images is based on an iterative reconstruction algorithm.

27. The method according to claim 25, wherein the reconstruction of the one or more PET scan images is based on a maximum likelihood expectation maximization (MLEM) algorithm.

28. The method according to claim 25, wherein the reconstruction of the one or more PET scan images is based on an ordered subsets expectation maximization (OSEM) algorithm.

29. The method according to claim 28, wherein the reconstruction of the one or more PET scan images is based on subsets of the chronological list of data, and the subsets are sorted based on one or more criteria.

30. The method according to claim 29, wherein the subsets are sorted based on energy values of the plurality of coincidence events.

31. The method according to claim 30, wherein the subsets are weighted based on the energy values.

32. The method according to claim 25, wherein the reconstruction of the one or more PET scan images starts before the detection of the plurality of coincidence events is completed.

33. The method according to claim 25, wherein the PET scanner is operating in a time-of flight (TOF) mode.

* * * * *